United States Patent
Segat et al.

(10) Patent No.: US 10,619,598 B2
(45) Date of Patent: Apr. 14, 2020

(54) NACELLE FOR AN AIRCRAFT ENGINE WITH VARIABLE SECTION NOZZLE

(71) Applicant: AIRCELLE, Gonfreville l'Orcher (FR)

(72) Inventors: Peter Segat, Courbevoie (FR); Sarah Tissot, Bois d'Arcy (FR); Xavier Bouteiller, Deville les Rouen (FR)

(73) Assignee: AIRCELLE, Gonfreville l'Orcher (FR)

( * ) Notice: Subject to any disclaimer, the term of this patent is extended or adjusted under 35 U.S.C. 154(b) by 944 days.

(21) Appl. No.: 15/093,805

(22) Filed: Apr. 8, 2016

(65) Prior Publication Data

US 2016/0222917 A1 Aug. 4, 2016

Related U.S. Application Data

(63) Continuation of application No. PCT/FR2014/052595, filed on Oct. 13, 2014.

(30) Foreign Application Priority Data

Oct. 11, 2013 (FR) ...................................... 13 59896

(51) Int. Cl.
*F02K 1/76* (2006.01)
*B64D 33/04* (2006.01)
(Continued)

(52) U.S. Cl.
CPC .............. *F02K 1/763* (2013.01); *B64D 33/04* (2013.01); *B64D 33/06* (2013.01); *F02K 1/06* (2013.01);
(Continued)

(58) Field of Classification Search
CPC ..... F02K 1/06; F02K 1/11; F02K 1/40; F02K 1/42; F02K 1/566; F02K 1/605;
(Continued)

(56) References Cited

U.S. PATENT DOCUMENTS 3,036,431 A * 5/1962 Vdolek ................... F02K 1/625
239/265.31
3,095,697 A * 7/1963 Reinhart ................... F02K 1/40
239/265.27
(Continued)

FOREIGN PATENT DOCUMENTS

EP 2433864 3/2012
FR 2622929 11/1987
(Continued)

OTHER PUBLICATIONS

International Search Report for International Application PCT/FR2014/052595, dated Jan. 10, 2015.

*Primary Examiner* — Todd E Manahan
*Assistant Examiner* — Marc J Amar
(74) *Attorney, Agent, or Firm* — Burris Law, PLLC (57) ABSTRACT

The present disclosure concerns a nacelle for an aircraft engine, which includes a thrust reverser cowling that is slidably mounted between a direct jet position, and a reversed jet position in which the cowling opens a passage in the nacelle and uncovers a deflection device, and at least one actuator for moving the cowling. The nozzle section of the cowling delimits at least one opening that is combined with a leakage door, the leakage door being movably mounted on the cowling between a closed position in which the door engages with the associated opening to counteract the flow of air through said opening, and an open escape position in which the door is retracted to allow a portion of the air flow to flow through said opening.

11 Claims, 5 Drawing Sheets

(51) Int. Cl.
*F02K 1/72* (2006.01)
*F02K 1/09* (2006.01)
*F02K 1/12* (2006.01)
*F02K 1/11* (2006.01)
*F02K 1/42* (2006.01)
*F02K 1/60* (2006.01)
*F02K 1/56* (2006.01)
*F02K 1/40* (2006.01)
*F02K 1/06* (2006.01)
*F02K 1/62* (2006.01)
*F02K 1/34* (2006.01)

(52) U.S. Cl.
CPC ............... *F02K 1/09* (2013.01); *F02K 1/11* (2013.01); *F02K 1/1261* (2013.01); *F02K 1/40* (2013.01); *F02K 1/42* (2013.01); *F02K 1/566* (2013.01); *F02K 1/605* (2013.01); *F02K 1/625* (2013.01); *F02K 1/72* (2013.01); *F02K 1/766* (2013.01); *F05D 2220/323* (2013.01); *F05D 2240/128* (2013.01); *F05D 2240/129* (2013.01)

(58) Field of Classification Search
CPC .......... F02K 1/625; F02K 1/72; B64D 33/04; B64D 33/06
See application file for complete search history.

(56) References Cited

U.S. PATENT DOCUMENTS

| | | | | |
|---|---|---|---|---|
| 3,308,625 A * | 3/1967 | Shaw | ............... | F02K 1/60 60/229 |
| 3,608,314 A * | 9/1971 | Colley | ............... | F02K 1/72 239/265.29 |
| 3,779,010 A * | 12/1973 | Chamay | ............... | F02K 1/09 60/226.2 |
| 3,990,530 A * | 11/1976 | Helfrich | ............... | B64D 33/06 181/215 |
| 4,731,991 A * | 3/1988 | Newton | ............... | F02K 1/72 239/265.31 |
| 4,922,713 A * | 5/1990 | Barbarin | ............... | F02K 1/09 239/265.31 |
| 5,221,048 A * | 6/1993 | Lair | ............... | F02K 1/11 239/265.19 |
| 5,516,061 A * | 5/1996 | Glasgow | ............... | B64B 1/30 239/265.29 |
| 5,575,147 A * | 11/1996 | Nikkanen | ............... | F02K 1/625 239/265.29 |
| 5,623,820 A * | 4/1997 | Balzer | ............... | B64D 27/00 60/39.091 |
| 5,863,014 A * | 1/1999 | Standish | ............... | F02K 1/70 239/265.29 |
| 9,587,583 B2 * | 3/2017 | Caruel | ............... | F02K 1/06 |
| 10,202,940 B2 * | 2/2019 | Todorovic | ............... | F02K 1/72 |
| 2012/0067975 A1 * | 3/2012 | Vauchel | ............... | F02K 1/72 239/265.33 |
| 2015/0354499 A1 * | 12/2015 | Caruel | ............... | F02K 1/06 239/265.19 |
| 2017/0030296 A1 * | 2/2017 | Dong | ............... | F02K 1/72 |

FOREIGN PATENT DOCUMENTS

| | | | |
|---|---|---|---|
| FR | 2910937 | 7/2008 | |
| FR | 2934326 | 1/2010 | |
| FR | 2978800 | 2/2013 | |
| WO | 2009029401 | 3/2009 | |
| WO | WO-2013021108 A1 * | 2/2013 | ............... F02K 1/06 |

* cited by examiner

NACELLE FOR AN AIRCRAFT ENGINE WITH VARIABLE SECTION NOZZLE

CROSS-REFERENCE TO RELATED APPLICATIONS

This application is a continuation of International Application No. PCT/FR2014/052595, filed on Oct. 13, 2014, which claims the benefit of FR 13/59896, filed on Oct. 11, 2013. The disclosures of the above applications are incorporated herein by reference.

FIELD

The present disclosure relates to a nacelle for an aircraft engine with a variable section nozzle.

BACKGROUND

The statements in this section merely provide background information related to the present disclosure and may not constitute prior art.

As is known, an aircraft engine nacelle allows conveying outside air toward the engine, of the turbojet engine type for example, and providing the ejection of air at high velocity so as to provide thrust.

In bypass turbojet engines, the air flow mixed by the fan is divided, downstream thereof, into a primary flow (also said "hot") which enters inside the core of the turbojet engine in order to undergo several compressions and an expansion, and a secondary flow (also said "cold"), which circulates inside a substantially annular flow path, defined on the one hand by a fairing of the engine (fixed internal structure, also called "IFS"), and on the other hand by the thickness of the nacelle.

The cold air flow, coming out downstream of the nacelle via an output nozzle defined by the downstream edge of the nacelle, provides most of the thrust.

Moreover, as is known, the nacelle incorporates very frequently thrust reversal means, allowing directing a portion of the secondary air flow upstream of the nacelle during landing, thereby actively contributing to the braking of the aircraft.

These thrust reversal means are often of the cascade type, that is to say that they include a series of vanes arranged downstream of the fan casing, at the periphery of the flow path of cold flow. These vanes can be uncovered on request by a thrust reverser cowl slidingly mounted on the structure of the nacelle.

In addition to a thrust reversal function, a movable thrust reverser cowl belongs to the rear section of the nacelle and may have a portion forming an ejection nozzle.

The section of the ejection nozzle of the cowl can be adjusted depending on the different phases of flights, which may in particular include take-off, climb, cruise, descent and landing in order to always keep a desired nozzle section depending on the turbojet engine speed. The nozzle will then be called variable section nozzle.

Such a variable section nozzle is associated with an actuating system allowing this section variation.

There are several solutions to make a variable section nozzle.

In particular, there is known a nacelle described and represented in the document FR-2622929, which is equipped with a movable thrust reverser cowl which has an upstream section intended to cover the cascade vanes, and a downstream section forming a variable section nozzle.

According to this document, the downstream section of the cowl has a generally annular shape, the downstream section being slidingly mounted axially on the upstream section to clear a leakage passage between the downstream section and the upstream section of the cowl.

This leakage passage allows a portion of the air flow flowing in the secondary flow path to be ejected, which amounts to expanding the section of the nozzle formed by the cowl.

Although this type of nacelle allows effectively varying the section of the nozzle, it has some disadvantages.

Indeed, the mechanical connection between the downstream movable annular portion and the upstream portion of the cowl constitutes a mechanical weakening of the nacelle.

In addition to weakening the thrust reverser cowl, this mechanical connection may also generate vibrations of the downstream annular portion of the cowl during the operation of the engine.

SUMMARY

The present disclosure provides a nacelle for an aircraft engine, of the type comprising:
  a thrust reverser cowl including a covering upstream section and a nozzle downstream section, the cowl being slidingly mounted along a direction generally parallel to the longitudinal axis of the nacelle, between a direct jet position in which the cowl covers a device for deflecting the air flow, and a reverse jet position in which the cowl opens a passage in the nacelle and uncovers the deflecting device, and
  a device for driving in displacement the cowl including at least one actuator,
  characterized in that the nozzle section of the cowl delimits at least one opening which is associated with a leakage door, the leakage door being movably mounted on the cowl between a closed position in which the door cooperates with the associated opening to oppose the flow of the air flow through said opening, and a leakage open position in which the door is retracted to allow the flow of a portion of the air flow through said opening.

Such a design allows making a one-piece movable thrust reverser cowl, the covering upstream section of the deflecting device and the nozzle downstream section being integrally made, in order to enhance the mechanical strength of the cowl.

According to another feature, the nacelle is equipped with a device for locking the leakage door on the movable cowl, the locking device being designed to adopt an unlocked state in which the leakage door is detached from the cowl, and a locked state in which the leakage door is locked on the cowl, so that the leakage door and the cowl are adapted to be simultaneously driven in displacement by the actuator.

The locking device allows driving in displacement the cowl and/or the door selectively or jointly, by the same actuator.

According to a first variant of the present disclosure, the leakage door is slidingly mounted between its closed position and its open position, along a direction generally parallel to the axis of the nacelle.

This first variant is associated with a flow deflecting device with movable cascade vanes, the latter generally offering more space to allow the sliding travel of the leakage door.

According to a second form of the present disclosure, the leakage door is pivotally mounted between its closed position and its open position about an axis substantially perpendicular to the axis of the nacelle.

This second variant is particularly adapted to a flow deflecting device for with fixed cascade vanes, the latter offering a limited space downstream of the cascade vane for housing the leakage door.

According to this second variant, the leakage door includes:
- an inner skin which is pivotally mounted on a fixed portion of the nacelle,
- an outer skin which extends opposite the inner skin and which is pivotally mounted on a fixed portion of the nacelle, the outer skin having an opening angle smaller than that of the inner skin in order to limit the aerodynamic disturbances outside the nacelle when the leakage door occupies its open position.

According to another aspect, the door has an outer face which is designed to provide the external aerodynamic continuity of the fairing of the nacelle, and an inner face which is designed to provide the internal aerodynamic continuity of the nacelle, when the door occupies its closed position.

In addition, the nacelle includes sealing system, which is designed to oppose the flow of air through the opening when the leakage door occupies its closed position.

By avoiding air leakages, the sealing system ensures improved operation and efficiency of the nacelle and of the associated engine.

In order to enhance the mechanical strength of the cowl, the covering upstream section and the nozzle downstream section of the cowl are integrally made in one form of the present disclosure.

In addition, the actuator includes an upstream body secured to a fixed portion of the nacelle and a downstream actuating rod which is slidingly mounted in the associated body along an axis generally parallel to the axis of the nacelle and which is connected on the leakage door to drive the leakage door in displacement.

According to one form of the present disclosure, the cowl delimits a plurality of openings which are distributed circularly around the longitudinal axis of the nacelle and which are each associated to a movable leakage door.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and the claims, to clarify the description and the claims, the terminology longitudinal, vertical and transverse will be adopted with no limitation with reference to the trihedron L, V, T indicated in the figures, whose axis L is parallel to the axis A of the nacelle.

Note that in the present disclosure, the terms "upstream" and "downstream" should be understood in relation to the circulation of the air flow inside the propulsion unit formed by the nacelle and the turbojet engine, that is to say from the left to the right with reference to FIGS. 1 to 13.

Similarly, the expressions "front" and "rear" will be used with no limitation respectively with reference to the left portion and right portion of FIGS. 1 to 13.

Figure 1:
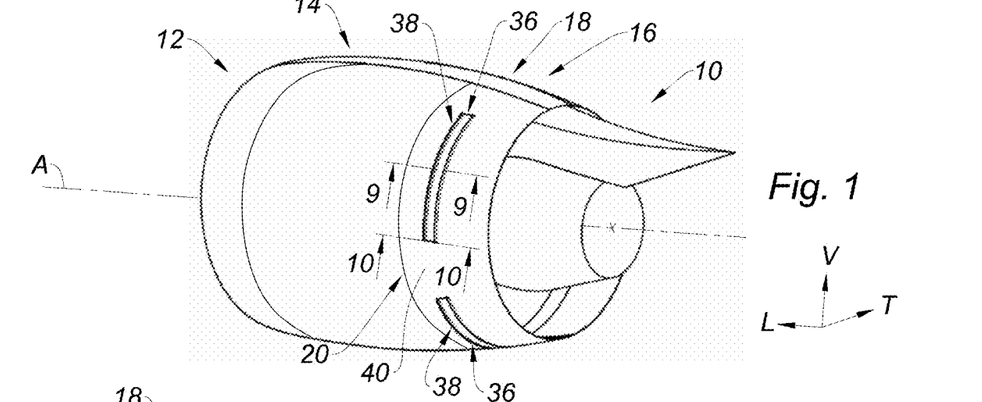
FIG. 1 is an overall perspective view, which illustrates an aircraft nacelle including a thrust reverser cowl delimiting four leakage openings, according to the present disclosure.

In FIG. 1, there is represented a nacelle 10 for an aircraft engine of the turbojet engine type (not represented), the nacelle 10 extending along a longitudinal axis A.

The nacelle 10 is intended to be suspended from an engine pylon 5 (not represented) via a fixation islet (not represented) forming a connection interface.

The nacelle 10 extends from the front to the back from an upstream air inlet section 12, a midsection 14 and a downstream section 16 equipped with a thrust reverser device 18.

Figure 2:
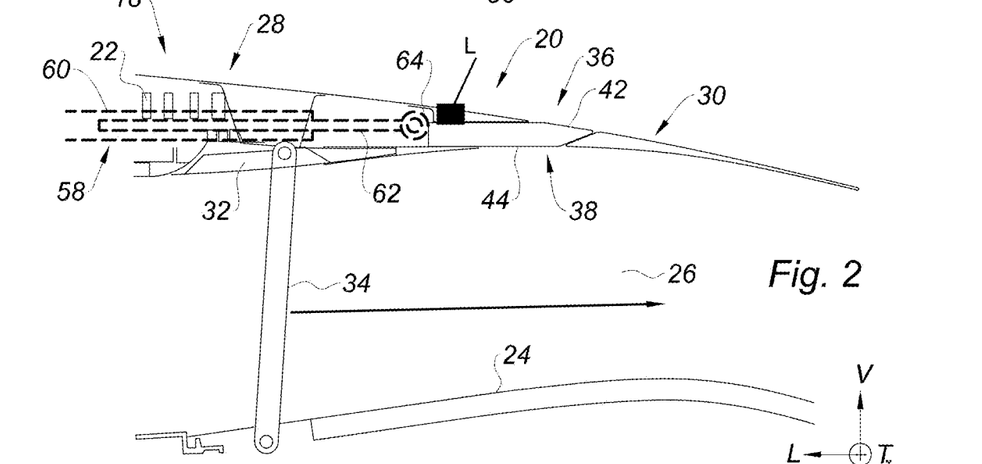
FIG. 2 is a schematic longitudinal sectional view, which illustrates the thrust reverser cowl of FIG. 1 in its direct jet position and the leakage door in its closed position, according to a first form of the present disclosure.

The thrust reverser device 18 comprises a substantially peripheral thrust reverser cowl 20 and a set of cascade vanes 22 (one of which is partially represented in FIG. 2).

Figure 3:
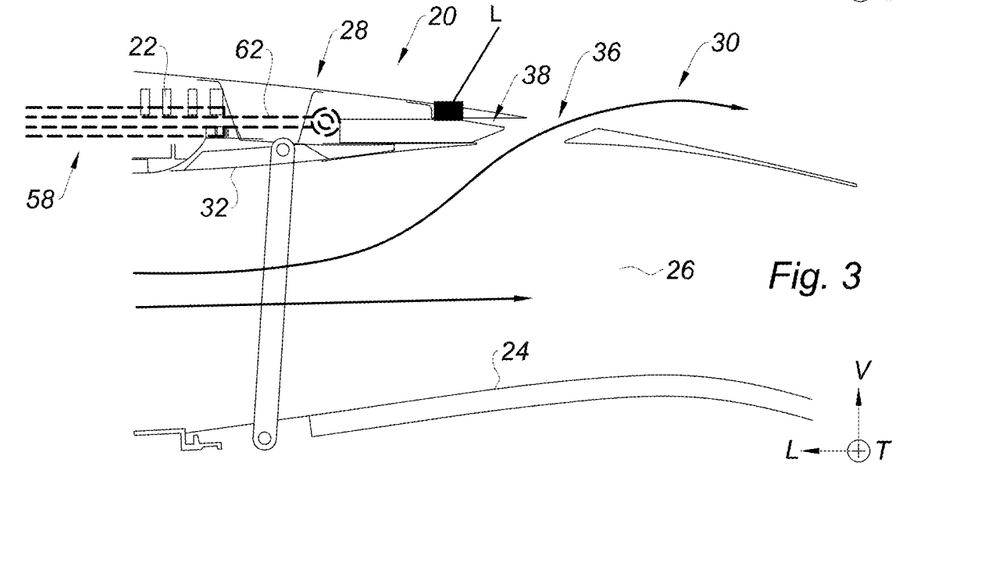
FIG. 3 is a schematic view similar to that of FIG. 2, which illustrates the thrust reverser cowl of FIG. 1 in its direct jet position and the leakage door in its open position, according to the first form of the present disclosure.
Figure 4:
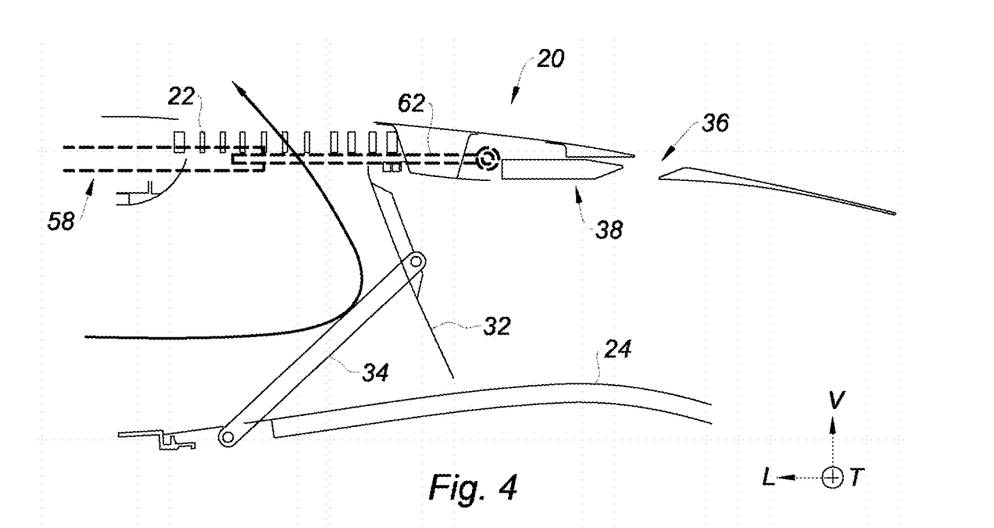
FIG. 4 is a schematic view similar to that of FIG. 2, which illustrates the thrust reverser cowl of FIG. 1 in its reverse jet position and the leakage door in its open position, according to the first form of the present disclosure.

The cascade vanes 22 are slidingly mounted along the axis A of the nacelle 10, between a retracted position represented in FIGS. 2 and 3, in which the vanes 22 are arranged at least partially in the thickness of the midsection 14 of the nacelle 10, and a deployed position represented in FIG. 4, in which the vanes 22 extend downstream of the midsection 14.

As can be seen in FIG. 2, the thrust reverser cowl 20 is arranged around an annular fixed inner structure 24 forming a fairing of the turbojet engine, to delimit a flow path 26 of a secondary air flow.

Furthermore, the cowl 20 includes an upstream covering section 28 of the cascade vanes 22 and a nozzle downstream section 30.

In addition, thrust reverser flaps 32 are hingedly mounted on the cowl 20 each via a connecting rod 34 pivotally mounted on the fairing fixed inner structure 24 of the turbojet engine.

The cowl 20 is slidingly mounted along a direction generally parallel to the axis A of the nacelle 10, between a direct jet position represented in FIGS. 1 to 3, in which the thrust reversal flaps 32 are arranged in the extension the thrust reversal cowl 20 to allow the free circulation of the air flow in the flow path 26 and the air flow cascade vanes 22 are covered and, a reverse jet position represented in FIG. 4, in which the cowl 20 is slid downstream of the cascade vanes 22, resulting in pivoting of the thrust reversal flaps 32 through the flow path 26 of the secondary air flow, causing the deflection of the air flow through the vanes 22, outward and upstream of the nacelle 10.

In addition, the cowl 20 is designed to adopt a further maintenance position (not represented), in which the cowl 20 is moved fully rearward to allow access to the interior of the nacelle 10.

According to another aspect, the nozzle section 30 of the cowl 20 delimits four openings 36 that are each associated with a leakage door 38.

The four openings 36 are arranged in a circle around the axis A of the nacelle 10, at the periphery of the nacelle, and they are each shaped in the form of a slot open radially outward of the nacelle 10, delimiting a passage between the flow path 26 of the air flow and the outside of the nacelle 10.

The openings 36 are separated into pairs by a rigid connection portion 40 of the cowl 20, represented in FIG. 1.

In order not to encumber the description, only one set constituted by an opening 36 and an associated leakage door 38 is described in detail hereinafter, the openings 36 and the associated doors 38 being all similar.

FIGS. 2 to 5 represent the cowl 20 of the nacelle 10 according to a first form 20 of the present disclosure.

According to this first form, the leakage door 38 is slidingly mounted on the cowl 20 longitudinally along the axis A of the nacelle 10, between a closed position represented in FIG. 2, in which the door 38 cooperates with the associated opening 36 to oppose the flow of the air flow through the opening 36, and an open leakage position represented in FIGS. 3 and 4, in which the door 38 is retracted to allow the flow of a portion of the air flow through the opening 36.

The air flow is represented by arrows in FIGS. 2 to 4.

Referring to FIG. 2, the leakage door 38 is delimited by an outer face 42 which is designed to provide external aerodynamic continuity of the fairing of the nacelle 10, and an inner face 44 which is designed to ensure the internal aerodynamic continuity of the nacelle 10, in order not to disturb the flow of the air flow through the flow path 26, when the door 38 occupies its closed position.

As can be seen in FIGS. 3 and 4, the leakage door 38 is generally arranged in the extension of the vane 22, downstream of the vane 22.

More specifically, the leakage door 38 is radially interposed between the flap 32 and the outer fairing of the cowl 20, when the door 38 occupies its open position and the cowl 20 occupies its direct jet position, with reference to FIG. 3.

Figure 5:
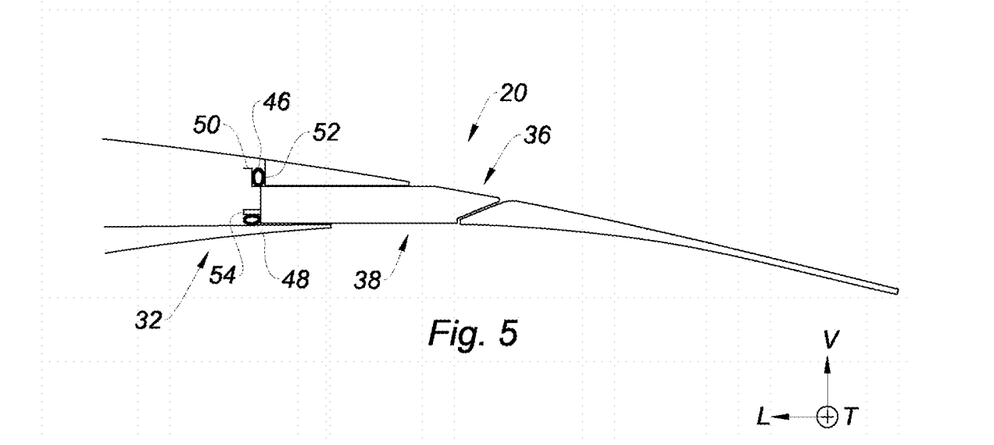
FIG. 5 is a schematic longitudinal sectional detail view, which illustrates a sealing system of the leakage door according to the first form of the present disclosure.

In addition, according to FIG. 5, the nacelle 10 includes a first O-ring seal 46 and a second O-ring seal 48 forming one variation of a sealing system according to the present disclosure, which are designed to oppose the flow of air through the opening 36 when the leakage door 38 occupies its closed position.

The first seal 46 is carried by a corner piece 50 which is arranged at an upstream end of the leakage door 38, facing a transverse edge 52 formed by the cowl 20, the first seal 46 being adapted to cooperate with the transverse edge 52 of the cowl 20 when the leakage door 38 is closed.

Similarly, the second seal 48 is carried by a corner piece 54 which is arranged at the upstream end of the leakage door 38, facing an outer face 56 of the reversal flap 32, the second seal 48 being adapted to cooperate with the outer face 56 of the flap 32 when the leakage door 38 is closed and the cowl 20 is in the direct jet position.

According to another aspect, the leakage door 38 is driven in displacement by an actuator 58 of the cylinder type which includes an upstream body 60 (partially represented) secured to a fixed portion of the nacelle 10 and a downstream actuating rod 62.

The actuating rod 62 of the actuator 58 is slidingly mounted in the associated body 60 longitudinally along an axis generally parallel to the axis A of the nacelle 10.

In addition, the rod 62 has a downstream free end 64 which is connected on the leakage door 38 to drive the door 38 in displacement.

In a complementary manner, the nacelle 10 is equipped with a locking device "L" for locking the leakage door 38 on the movable cowl 20.

The locking device L is designed to adopt an unlocked state in which the leakage door 38 is detached from the cowl 20 and is capable to be driven in displacement separately, directly by the associated actuator 58, and a locked state in which the leakage door 38 is locked on the cowl 20 so that the leakage door 38 and the cowl 20 are adapted to be simultaneously driven in displacement by the actuator 58.

The locking device L is of a type such as a claw or hook lock, and it is associated with any known control type, whether hydraulic, electric or pneumatic, linked to the control system of the nacelle 10 also of a known type.

An example of the different steps of locking and unlocking the leakage door 38 and the cowl 20 is represented in FIGS. 2 to 5.

In FIG. 2, the leakage door 38 is closed and the cowl 20 occupies its direct flow position.

In FIG. 3, the leakage door 38 is driven in translation rearward by the actuator 58, from its closed position, to its open position, thereby causing an increase of the nozzle section 30 formed by the cowl 20.

To this end, the locking device L occupies an unlocked state to detach the leakage door 38 and the cowl 20.

Conversely, referring to FIG. 4, the locking device L occupies a locked state to secure the cowl 20 and the leakage door 38 in displacement, while the set formed by the cowl 20 and the leakage door 38 is driven rearward by the actuator 58 until the cowl 20 occupies its indirect jet position, in order to uncover the cascade vane 22 and pivotally drive the flap 32.

FIGS. 6 to 16 represent the cowl 20 of the nacelle 10 according to a second form of the present disclosure.

Figure 6:
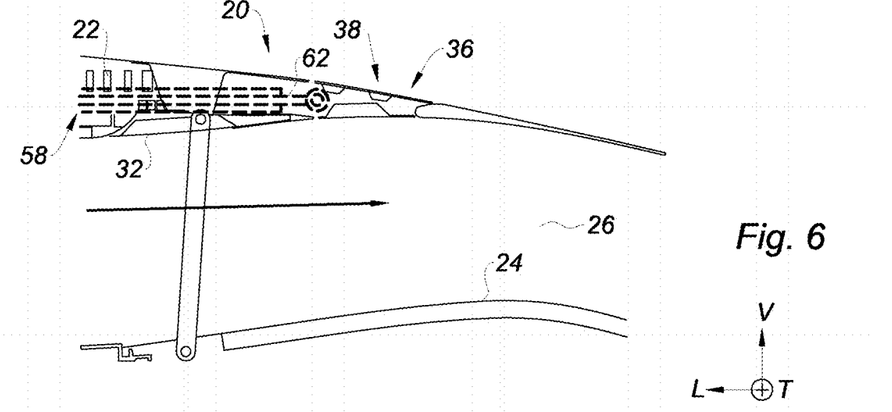
FIG. 6 is a schematic longitudinal sectional view, which illustrates the thrust reverser cowl of FIG. 1 in its direct jet position and the leakage door in its closed position, according to a second form of the present disclosure.
Figure 7:
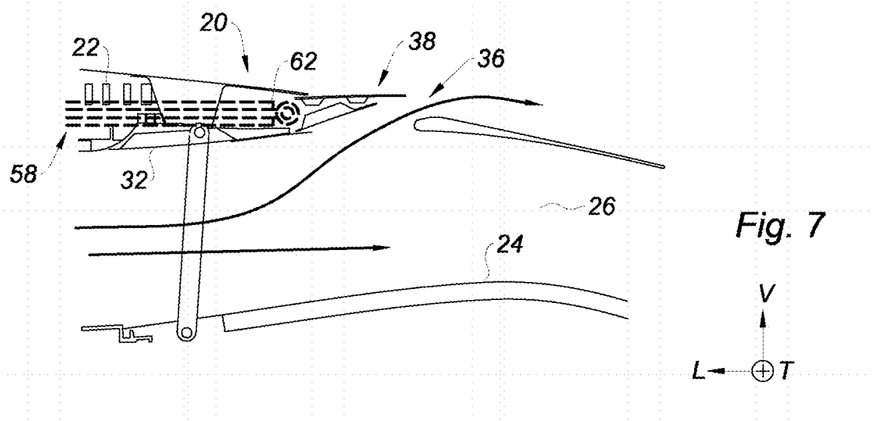
FIG. 7 is a schematic view similar to that of FIG. 6, which illustrates the thrust reverser cowl of FIG. 1 in its direct jet position and the leakage door in its open position, according to the second form of the present disclosure.
Figure 8:
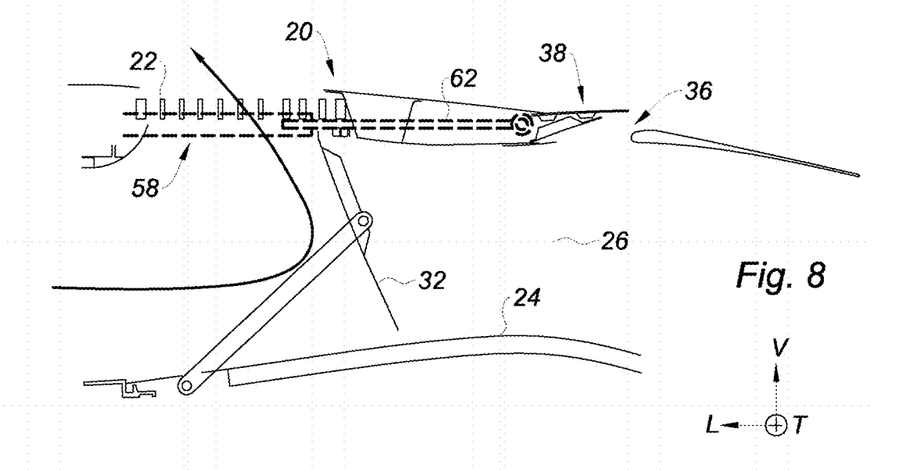
FIG. 8 is a schematic view similar to that of FIG. 6, which illustrates the thrust reverser cowl of FIG. 1 in its reverse jet position and the leakage door in its open position, according to the second form of the present disclosure.
Figure 9:
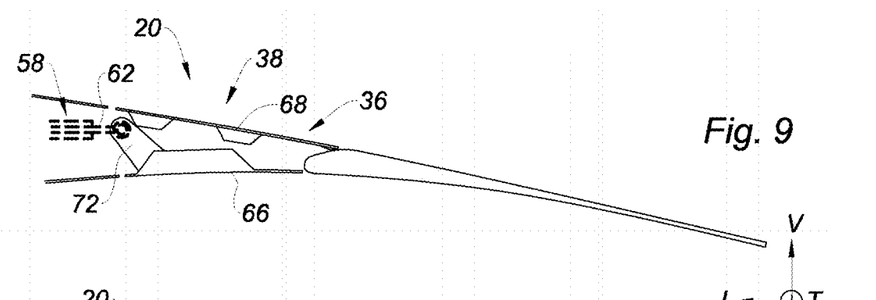
FIG. 9 is a schematic longitudinal sectional detail view along the axis 9-9 of FIG. 1, which illustrates the hinge of the leakage door represented in its closed position, according to the second form of the present disclosure.
Figure 10:
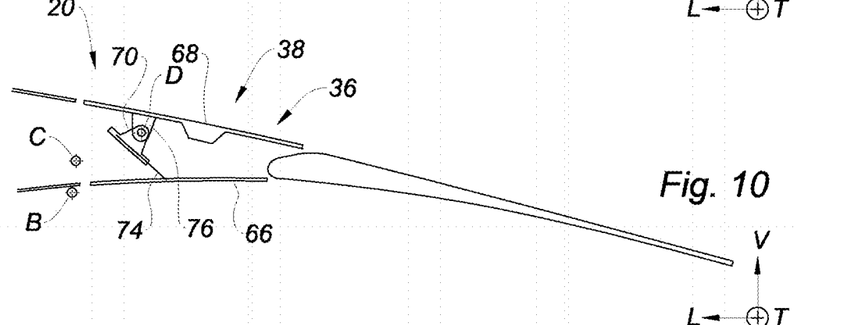
FIG. 10 is a schematic longitudinal sectional detail view along the axis 10-10 of FIG. 1, which illustrates the hinge of the leakage door represented in its closed position, according to the second form of the present disclosure.
Figure 11:
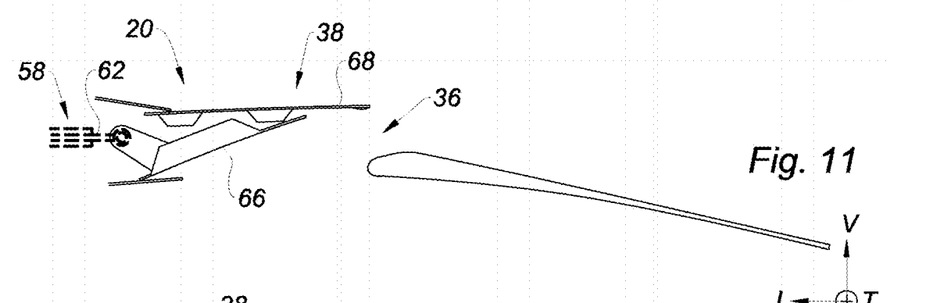
FIG. 11 is a schematic longitudinal sectional detail view along the axis 9-9 of FIG. 1, which illustrates the hinge of the leakage door represented in its open position, according to the second form of the present disclosure.

According to this second form, the leakage door 38 is pivotally mounted on the cowl 20, between a closed position represented in FIGS. 6, 9 and 10, in which the door 38 cooperates with the associated opening 36 to oppose the flow of the air flow through the opening 36, and a leakage open position represented in FIGS. 7, 8, 11 and 12 in which the leakage door 38 is retracted to allow the flow of a portion of the air flow through the opening 36.

The air flow is represented by arrows in FIGS. 6 to 8.

According to the second form of the present disclosure, as can be seen in detail in FIGS. 9 to 12, the leakage door 38 includes an inner skin 66, an outer skin 68 and a slide 70 which slidingly connects the inner skin 66 and the outer skin 68 together.

The inner skin 66 and the outer skin 68 are pivotally mounted on the cowl 20 about an axis B and an axis C, respectively, the axes B and C being perpendicular to the axis A of the nacelle 10 and shifted from each other, the pivot axis B of the inner skin 66 being radially closer to the central axis A of the nacelle 10 than the pivot axis C of the outer skin 68, as can be seen in FIG. 10.

Furthermore, according to FIG. 9, the inner skin 66 has an upstream portion 72 which is pivotally mounted on the actuating rod 62 of the actuator 58.

In addition, according to FIG. 10, the inner skin 66 includes a guide rail 74 which extends toward the outer skin 68 and which is slidingly mounted in the slide 70 provided for this purpose.

In a complementary manner, the slide 70 is equipped with a pivot head 76 which is pivotally mounted on the outer skin 68, so that the slide 70 is pivotally hinged on the outer skin 68 about an axis D perpendicular to the axis A of the nacelle 10, and parallel to the pivot axes B and C of the inner skin 66 and outer skin 68, respectively.

The pivoting drive of the leakage door 38 according to the second form, from its open position to its closed position, is described below.

The rod 62 of the actuator 58 is driven forward, or upstream, of the nacelle 10 so that the inner skin 66 pivots about its pivot axis B.

Figure 12:
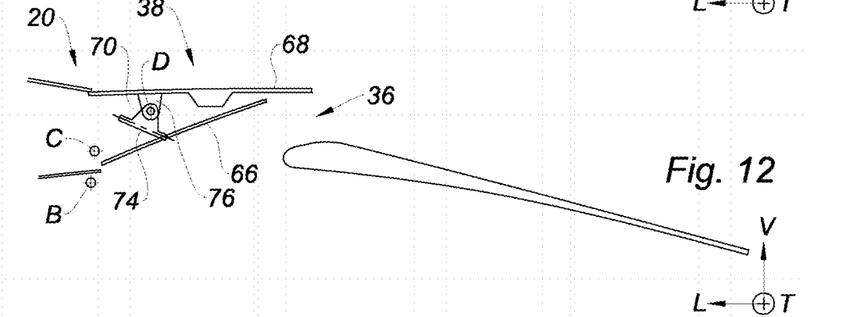
FIG. 12 is a schematic longitudinal sectional detail view along the axis 10-10 of FIG. 1, which illustrates the hinge of the leakage door represented in its open position, according to the second form of the present disclosure.

Simultaneously, as can be seen in FIG. 12, the guide rail 74 of the inner skin 66 slides in the slide 70, the slide 70 being then driven in displacement substantially radially outward of the nacelle 10, the slide 70 jointly pivotally driving the outer skin 68 about its pivot axis C.

Such a mechanism allows the outer skin 68 to have an opening angle smaller than that of the inner skin 66 to limit the overlapping of the outer skin 68 outside the nacelle 10 when the leakage door 38 is in its open position, in order to limit aerodynamic disturbances outside the nacelle 10.

Figure 13:
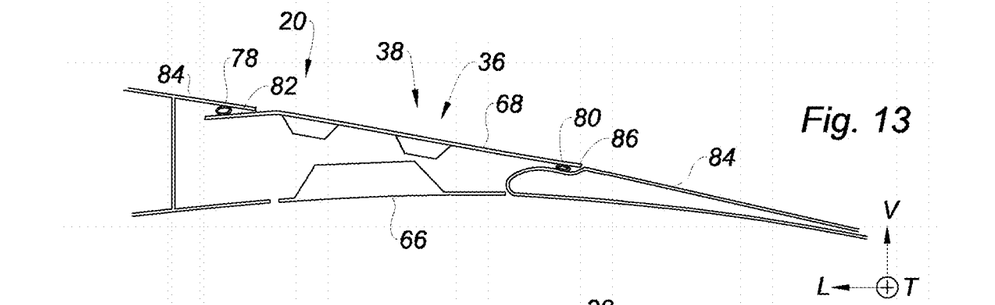
FIG. 13 is a schematic longitudinal sectional detail view, which illustrates a sealing system of the leakage door according to the second form of the present disclosure.

According to another aspect, with reference to FIG. 13, still according to the second form of the present disclosure, the door 38 is equipped with a first upstream seal 78 and a second downstream seal 80 of the O-ring type, forming a sealing system between the door 38 and the associated opening 36 of the cowl 20, when the door 38 occupies its closed position.

To this end, the first upstream seal 78 is interposed between an upstream end portion 82 of the outer skin 68 of the door 38, and an outer envelope 84 of the cowl 20.

Similarly, the second downstream seal 80 is interposed between a downstream portion 86 of the outer skin 68 of the door 38 and the outer envelope 84 of the cowl 20.

Figure 14:
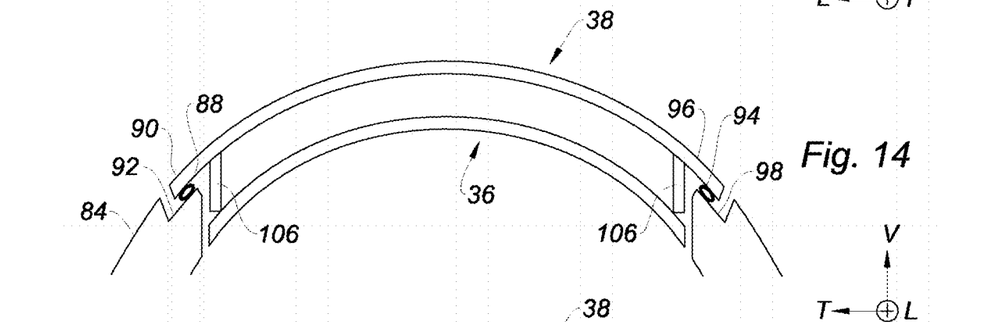
FIG. 14 is a schematic cross-sectional view, which illustrates a side sealing system of the leakage door according to the second form of the present disclosure.

In a complementary manner, as represented in FIG. 14, the leakage door 38 is equipped with a side sealing system between the door 38 and the associated opening 36 of the cowl 20, in order to inhibit the transverse or side air leakages, that is to say in a direction perpendicular to the axis A of the nacelle 10, between the door 38 and the associated opening 36, when the door 38 occupies its closed position.

The side sealing system in one form includes a first seal 88 which is interposed between a first longitudinal side edge 90 of the door 38 and a complementary first longitudinal side edge 92 of the outer envelope 84 of the cowl 20.

In a symmetrical manner, this side sealing system includes a second seal 94 which is interposed between a second longitudinal side edge 96 of the door 38 and a complementary second longitudinal side edge 98 of the outer envelope 84 of the cowl 20.

Figures 15, 16:
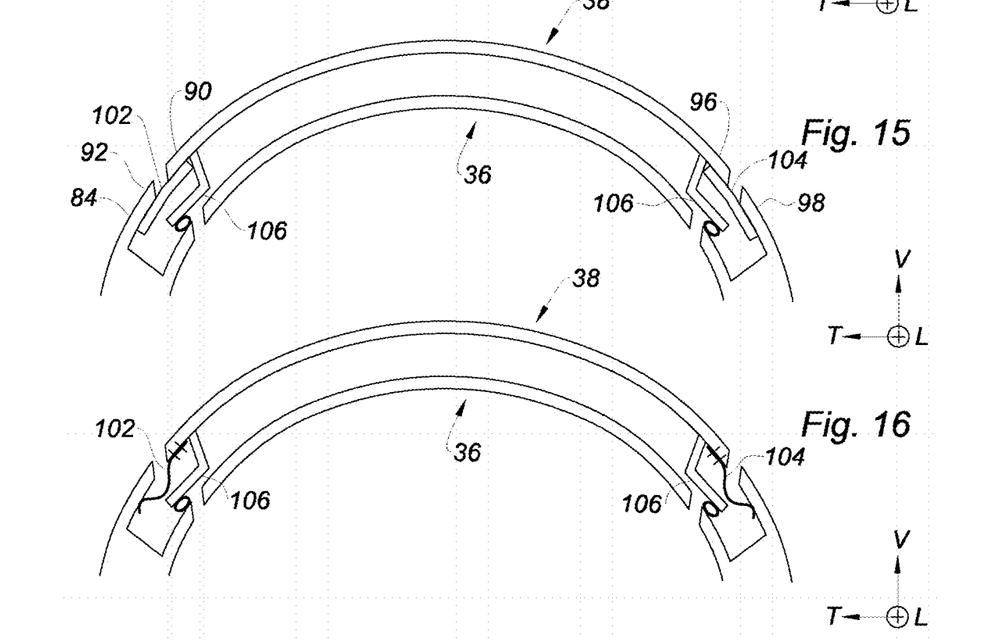
FIG. 15 is a schematic view similar to that of FIG. 14, which illustrates a first variant of the side sealing system of the leakage door according to the second form of the present disclosure.
FIG. 16 is a schematic view similar to that of FIG. 14, which illustrates a second variant of the side sealing system of the leakage door according to the second form of the present disclosure.

According to a variant of the side sealing system, represented in FIG. 15, the door 38 includes a first sealing strip 102 which extends from the first longitudinal side edge 90 of the door 38, to the first side edge 92 of the outer envelope 84 of the cowl 20, in order to inhibit the side air leakages between the door 38 and the associated opening 36.

In a symmetrical manner, the door 38 includes a second sealing strip 104 which extends from the second longitudinal side edge 96 of the door 38, to the second side edge 98 of the outer envelope 84 of the cowl 20.

Finally, according to another variant of the side sealing system, represented in FIG. 16, the first sealing strip 102 is fixed on the first longitudinal side edge 90 of the door 38 and on the first side edge 92 of the outer envelope 84 of the cowl 20, so that the first sealing strip 102 forms a bib, or a web, to avoid the flow of air on the sides of the door 38, in order to promote a longitudinal axial flow of air through the opening 36 when the door 38 is open, thereby enhancing the thrust performances of the nacelle 10.

To this end, the first sealing strip is made of a resiliently deformable material, such as an elastomer.

In a symmetrical manner, the second sealing strip 104 is fixed on the second longitudinal side edge 96 of the door 38 and on the second side edge 92 of the outer envelope 84 of the cowl 20.

In addition, in order to avoid the flow of air on the sides of the door 38, rigid side bibs 106 are arranged on each side of the door 38, as can be seen in FIGS. 14 to 16.

Without limitation, the present disclosure also applies to a nacelle comprising a thrust reverser device 22 with so-called "fixed" cascade vanes.

Similarly, the present disclosure is not limited to a cowl 20 delimiting four openings 36, the number of openings may be, for example, six.

Nonetheless, this type of thrust reverser device with fixed vanes offering a smaller space for housing the leakage doors, it will be in one form associated with the second form of the present disclosure according to which the leakage door 38 is pivotable and uses only a reduced travel space in the cowl 20.

What is claimed is:

1. A nacelle for an aircraft engine comprising:
   a thrust reverser cowl including a covering upstream section and a nozzle downstream section, the thrust reverser cowl being slidingly mounted along a direction generally parallel to a longitudinal axis of the nacelle, between a direct jet position in which the thrust reverser cowl covers a device for deflecting air flow, and a reverse jet position in which the thrust reverser cowl opens a passage in the nacelle and uncovers the deflecting device;
   at least one actuator for driving displacement of the thrust reverser cowl; and
   at least one opening delimited by the nozzle downstream section of the thrust reverser cowl and which is associated to a leakage door, the leakage door being movably mounted on the thrust reverser cowl between a closed position in which the leakage door cooperates with the at least one opening to oppose a flow of the air flow through said at least one opening, and a leakage open position in which the leakage door is retracted to allow for a flow of a portion of the air flow through said at least one opening,
   wherein the leakage door is:
      pivotally mounted between the closed position and the open position about an axis substantially perpendicular to the axis of the nacelle, the pivoting leakage door including:
         an inner skin pivotally mounted on the thrust reverser cowl about a first pivot axis, and
         an outer skin extending opposite the inner skin and pivotally mounted on the thrust reverser cowl about a second pivot axis, wherein the first and second pivot axes are perpendicular to the longitudinal axis of the nacelle and shifted from each other, the first pivot axis being radially closer to the longitudinal axis of the nacelle than the second pivot axis, so that the outer skin has a counter clockwise rotation opening angle from the closed position smaller than that of the inner skin in order to reduce aerodynamic disturbances outside the nacelle when the leakage door occupies the open position.

2. The nacelle for an aircraft engine according to claim 1, wherein the leakage door has an outer face which is designed to provide external aerodynamic continuity of a fairing of the nacelle, and an inner face which is designed to provide internal aerodynamic continuity of the nacelle, when the door occupies the closed position.

3. The nacelle for an aircraft engine according to claim 1, further comprising a sealing system designed to oppose the flow of air through the at least one opening when the leakage door occupies the closed position.

4. The nacelle for an aircraft engine according to claim 1, wherein the covering upstream section and the nozzle downstream section of the thrust reverser cowl are integrally made.

5. The nacelle for an aircraft engine according to claim 1, wherein the at least one actuator includes an upstream body secured to a fixed portion of the nacelle and a downstream actuating rod which is slidingly mounted in the upstream body along an axis generally parallel to the axis of the nacelle and which is connected to the leakage door to drive the leakage door in displacement.

6. The nacelle for an aircraft engine according to claim 1, wherein the thrust reverser cowl delimits a plurality of openings of the at least one opening which are distributed circularly around the longitudinal axis of the nacelle and which are each associated with a respective one of a plurality of the leakage doors.

7. The nacelle for an aircraft engine according to claim 1, wherein the leakage door includes a slide slidingly connecting the inner skin and the outer skin together.

8. The nacelle for an aircraft engine according to claim 7, wherein the inner skin has an upstream portion which is pivotally mounted on an actuating rod of the at least one actuator.

9. The nacelle for an aircraft engine according to claim 7, wherein the inner skin includes a guide rail extending towards the outer skin and is slidingly mounted in the slide.

10. The nacelle for an aircraft engine according to claim 7, wherein the slide comprises a pivot head pivotally mounted on the outer skin such that the slide is pivotally hinged on the outer skin about an axis perpendicular to the longitudinal axis of the nacelle.

11. The nacelle for an aircraft engine according to claim 1, wherein the leakage door comprises a side sealing system between the leakage door and the at least one opening of the thrust reverser cowl.

\* \* \* \* \*